(No Model.) 5 Sheets—Sheet 1

N. BOSMANN.
BRIDGE GATE.

No. 472,009. Patented Mar. 29, 1892.

(No Model.) 5 Sheets—Sheet 3.
N. BOSMANN.
BRIDGE GATE.

No. 472,009. Patented Mar. 29, 1892.

Witnesses:
Inventor:
Nicolas Bosmann
by Elliott & Onohundro
Atty's (No Model.) 5 Sheets—Sheet 4.
N. BOSMANN.
BRIDGE GATE.
No. 472,009. Patented Mar. 29, 1892.
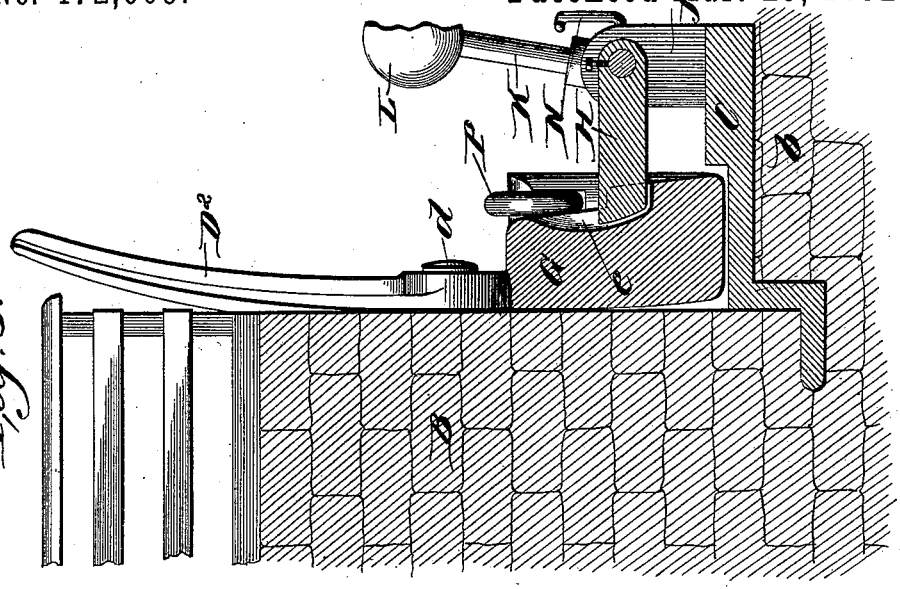
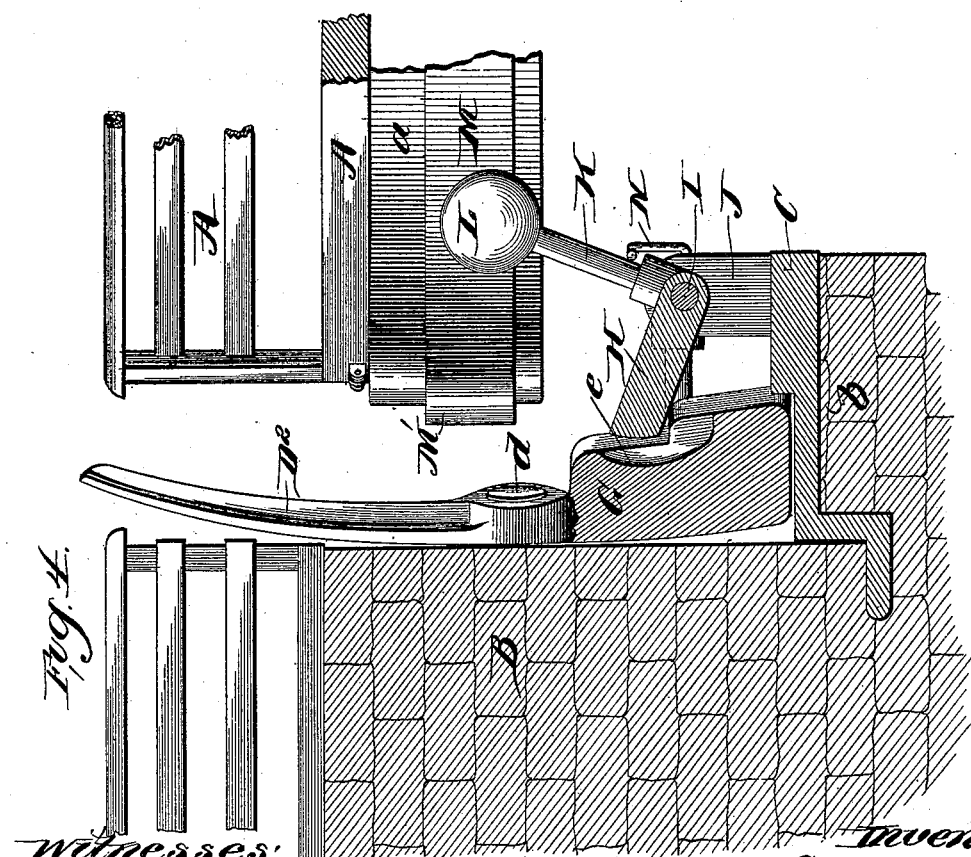

(No Model.)  5 Sheets—Sheet 5.
N. BOSMANN.
BRIDGE GATE.
No. 472,009. Patented Mar. 29, 1892.
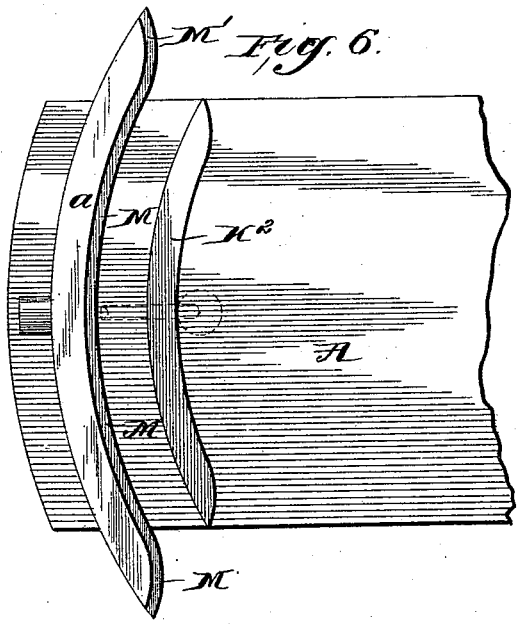
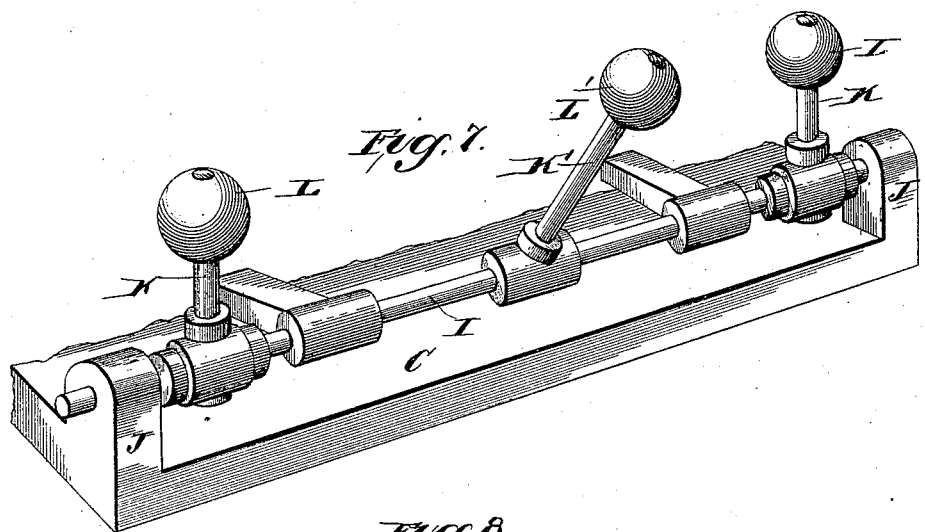
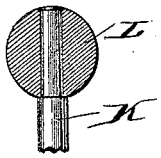
Witnesses:
Inventor:
Nicolas Bosmann
By Elliott & Omohundro
Attys

UNITED STATES PATENT OFFICE.

NICOLAS BOSMANN, OF CHICAGO, ILLINOIS, ASSIGNOR OF ONE-HALF TO GEORGE M. STERNE, OF SAME PLACE.

BRIDGE-GATE.

SPECIFICATION forming part of Letters Patent No. 472,009, dated March 29, 1892.

Application filed July 23, 1891. Serial No. 400,442. (No model.)

*To all whom it may concern:*

Be it known that I, NICOLAS BOSMANN, a citizen of the United States, and a resident of the city of Chicago, county of Cook, and State of Illinois, have invented certain new and useful Improvements in Bridge-Gates, of which the following is a specification.

This invention relates to improvements in bridge-gates especially designed for use with turn-bridges and for the purpose of closing the passage-way to the bridge when the same is open.

The prime object of this invention is to have a gateway of such flexible character and so actuated by the turn-bridge that it will open and close with the opening and closing of the bridge, so that the gate will gradually close as the bridge is swung toward an open position and open as the bridge is swung toward a closed position, where at all times during the opening and closing of the bridge vehicles and passengers are prevented from passing off the abutment or approach except upon the bridge itself.

A further object of this invention is to have such a construction of gate-operating devices that by no possibility can the gate open when the bridge is closed or close when the bridge is open or partly open.

Another object is to have the gate and gate-operating devices between the gate and bridge of minimum simplicity in construction and maximum durability for standing the rough usages to which said gates and devices are necessarily subjected and with such a certainty of operation that the gate may be truly said to be at all times where it is wanted, when it is wanted, and out of the way when it is not wanted.

These objects are attained by the devices illustrated in the accompanying drawings, in which—

Figure 1:
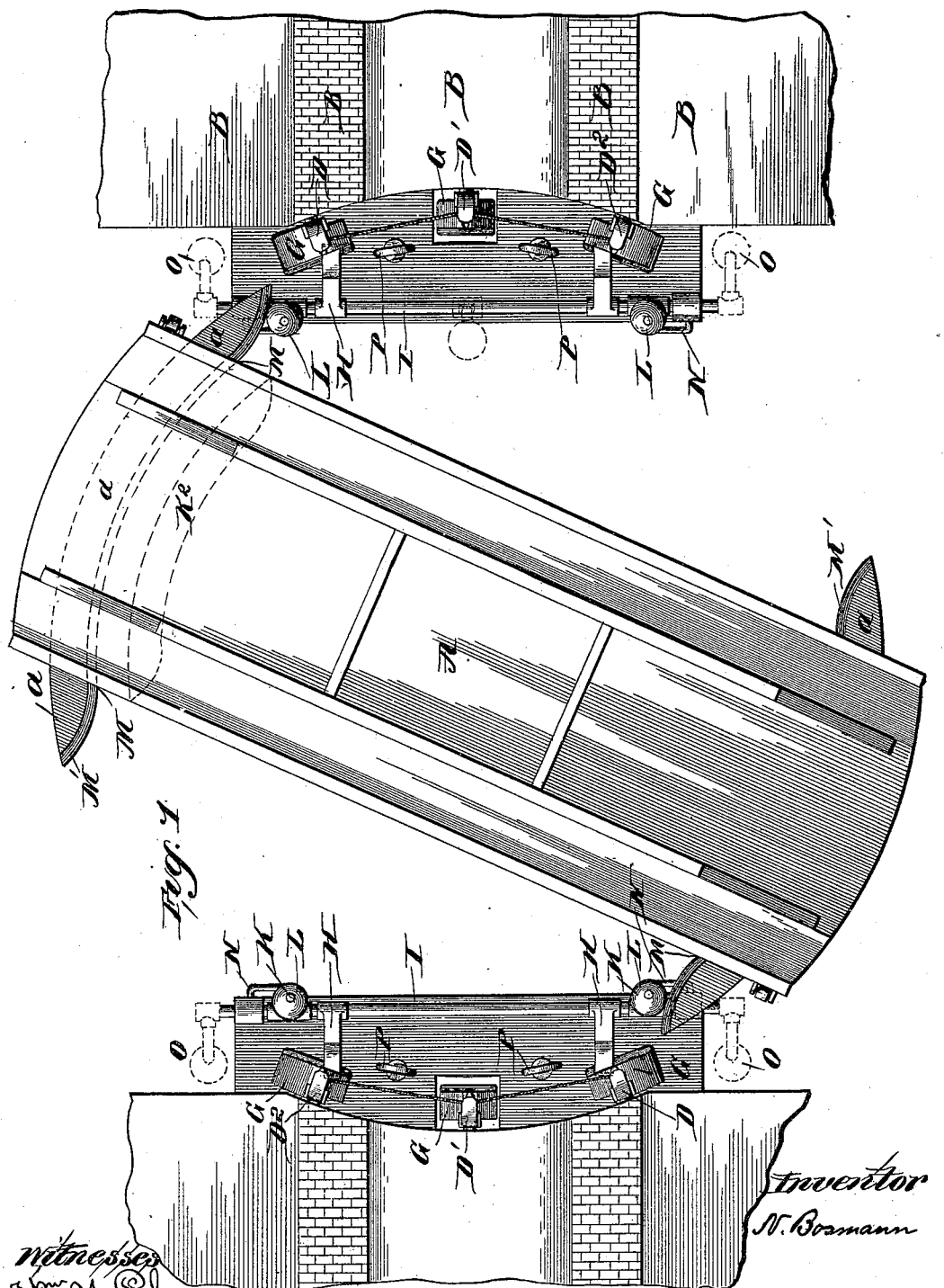
Figure 2:
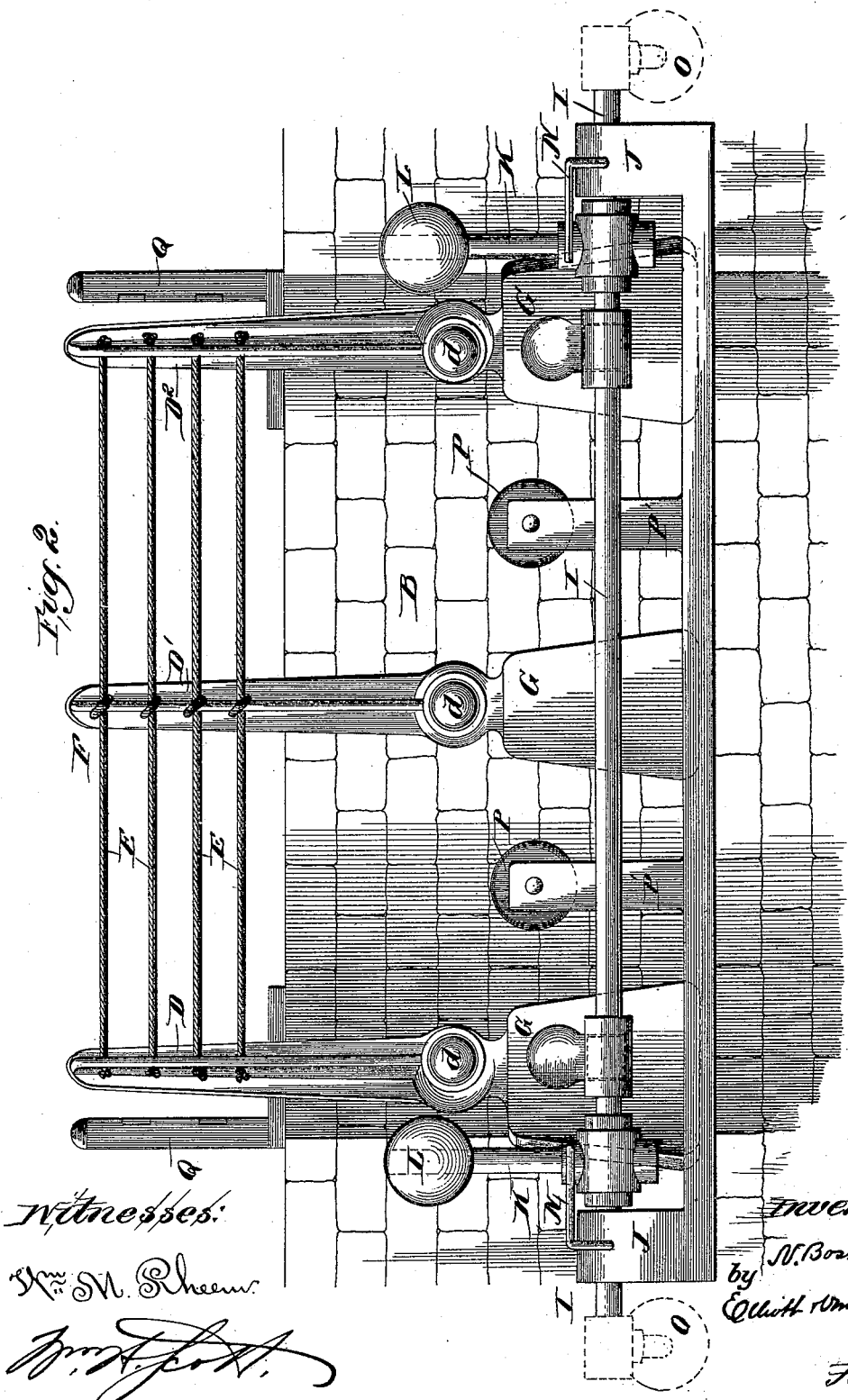
Figure 3:
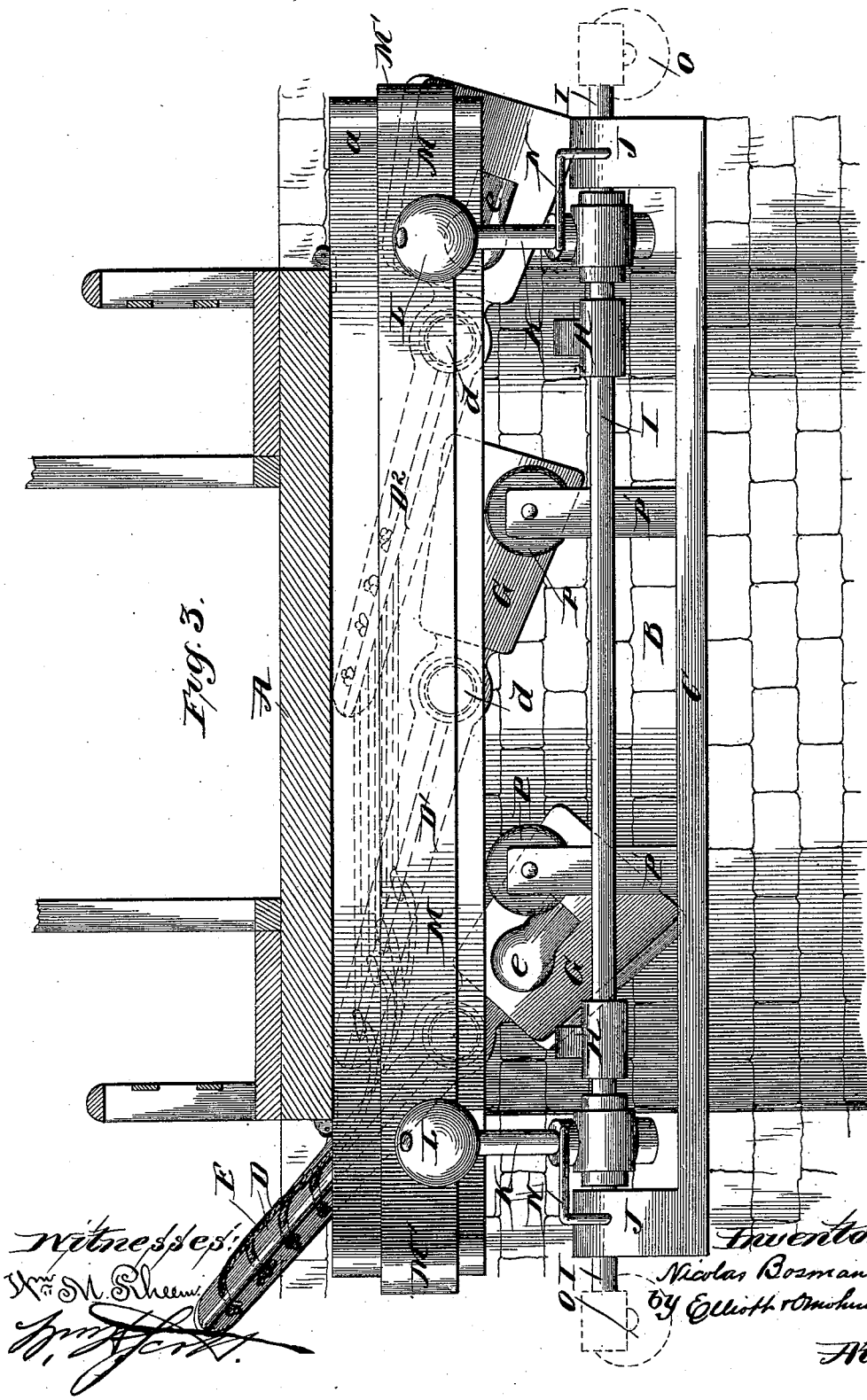

Figure 1 represents a top plan view of a bridge-gate embodying my invention with the turn-bridge swung to an open position with reference to said gate or gates; Fig. 2, a front elevation of the same with the bridge removed, and more particularly showing the gate in a closed position and the relative position thereto of the gate-actuating devices; Fig. 3, a similar view in cross-section through the bridge rearward of the bridge-engaging devices and with the bridge in a nearly-closed position; Fig. 4, a detail transverse section with the gate in a closed position with the bridge just disengaged therefrom, but more particularly showing the relation of the locking devices to the gate; Fig. 5, a similar view with the bridge removed, the gate closed, and the locking devices in engagement therewith; Fig. 6, a bottom plan view of one end of the bridge, more especially showing a modified form of the gate-actuating devices on the bridge; Fig. 7, a detail perspective view showing a modified form of the gate locking and unlocking devices; Fig. 8, a detail sectional view of one of the latch-actuating arms, showing the arrangement thereon of its anti-friction roller.

Similar letters of reference indicate the same parts in the several figures of the drawings.

A represents the ordinary turn-table provided at both ends with the usual end ledge $a$ (see Figs. 3 and 4) and supported and turning upon a central pier (not shown) of the usual construction, so that the bridge may be swung to open and close the space between opposing masonry abutments B, provided with the usual ledge $b$ below the upper face thereof.

Mounted upon the ledge $b$ is a base-plate C, which may be of any suitable material and construction for supporting the devices hereinafter described, but is preferably made of metal and angular in form, so that it may be projected into the abutment and thereby held rigidly in position upon the ledge $b$, as shown in Figs. 4 and 5.

Pivoted in any suitable manner to the vertical face of the abutment B are standards D D' D², of any desired number, flexibly connected with each other by ropes, cables, chains, or other jointed devices E, so that when the standards are in an upright position, as shown in Fig. 2, said jointed connections will be taut and the standards maintained thereby substantially parallel to each other, and as a result constitute a flexible bridge-gate, which, as a whole, is designated as F for convenience hereinafter. Connected with or attached to these standards below their pivots are weights G, which, when the standards are free—that is to say, released from the locking devices—maintain said standards in an upright position and the ropes taut, as shown in Fig. 2, the weights to this end being suspended in mid-air by the standards, so as to move with the standards upon the pivots $d$ thereof.

The standard at each end of any number of standards used to constitute this flexible gate have their weighted ends provided with depressions or recesses $e$ for the engagement of locking devices, hereinafter described, said depressions being preferably larger at their upper than at their lower ends, as shown in Fig. 3, but may be of any other form adapted to permit said locking devices to engage and lock the standards in their upright position and be disengaged therefrom as the bridge is swung toward a closed position, so that the standards may be depressed below the bridge-surface and out of the roadway leading to the bridge. The devices for locking the standards consist of latches H, secured upon a shaft I, journaled in lugs J, projecting from the base C or directly from the ledge B, as may be preferred, which latches H should have sufficient gravity to cause them to engage and lock the gate-standards when not opposed by the force of the bridge, as hereinafter described.

Toward each end of the shaft I and secured thereto are upright arms K, having on their free ends rotatable anti-friction balls, (shown in section in Fig. 8,) which are engaged by a segmental flange M, secured to the ledge $a$ of the bridge, which ledge and flange preferably project beyond the sides of the bridge and have their projecting ends reversely curved, as shown at M', whereby the flange M may engage and actuate the rollers L and arms K, so as to lift and disengage the latches from the bridge-gate, as will now be more clearly described.

When the bridge is in the open position, as shown in Fig. 1, the gate-standards are in the upright position shown in Fig. 2 and locked in that position by the engagement of the latches H with said standards, as shown in Fig. 5, in which position the arms K are in the nearest vertical position they are capable of and in a line outside of and beyond the face of the flange M, as indicated in Fig. 1. Now if we swing the bridge toward a closed position, the moment the reversely-curved ends M' strike the anti-friction rollers L said rollers are thereby forced inwardly toward the bridge, the arms K accordingly depressed, and by the time the rollers are in engagement with the flange M the latches H are released from the gate-standards, as shown in Fig. 4. As the closing movement of the bridge is continued, the bridge next comes in contact with the gate-standards, which, being pivoted and flexibly connected, are as a result depressed by the bridge below the surface thereof, and to the inclined position shown particularly by dotted lines in Fig. 3. One of the end standards, however—as, for instance, D in Fig. 3—at this time may not when the bridge is closed be depressed entirely below the same; but in any event it is pushed out of the way of the bridge-approach and will be entirely depressed if on again opening the bridge it is swung toward the standard D. The arms K continue to remain depressed and the latches H disengage from the gate so long as the bridge remains closed, for during that time the rollers L are in engagement with the flange M. If on opening the bridge it is swung to the right in Fig. 3, the several gate-standards will successively rise to an upright position as soon as the bridge has passed beyond a vertical line through their pivots, and as soon as the arms K, through their rollers L, are released from the flange M the latch-bolts will be released and dropped into engagement with the weighted ends of the gate-standards, thereby locking said standards in their upright position until the bridge is again closed. If, on the other hand, the bridge is swung to the left in Fig. 3, the gate-standard D will first be depressed and the standard $D^2$ will not rise to an upright position until the adjacent standard D' is released by the bridge, and, in fact, none of the standards can assume an absolutely upright position when the gate is so swung to the left until the bridge has disengaged all of the standards.

In order that a quick stroke of the bridge against the arms K may not depress said arms too far and thereby destroy the gravity action of the latches H, a lug or other suitable devices N (see Fig. 3) are projected across the path of movement of the arms K, so as to operate as stops, limiting the depression of said arms to the elevation of the latches; but any other means for accomplishing this end would be within my invention.

Instead of weighting the latches themselves, the shaft I may be weighted, as indicated by dotted lines at O, and said weights consist of arms projecting substantially at a right angle to the arms K and toward the abutments, and be provided with weights at their extremities; or, in other words, these weights may in outline be precisely like the arms K and rollers L.

In Figs. 6 and 7 is illustrated a modified form of my invention, which form consists in securing to the shaft I and supplemental arms K' an anti-friction roller L' precisely like the arms and roller K and L, except that the supplemental arm K' is longer and has more inclination than the arms K, whereby it is adapted to be engaged by a supplemental segmental flange $K^2$, as indicated by dotted lines in Fig. 6, which flange $K^2$ is secured to the under side of the bridge and nearer the bridge center than the flange M, but need not project beyond the sides of the bridge, as does the latter. The purpose of this supplemental arm and flange is to give the arms K an additional downward movement and to maintain them so depressed and the latches disengaged from the gate-standards when for any reason there is a liability of the arms K to rise and the latches to fall before the bridge is entirely open, or before the standards have risen to a vertical position, and in such a position that the latches may with certainty register with and enter the depressions or keepers formed in the weighted ends of the standards. Ordinarily this supplemental arm and flange are not a necessity and are only shown for the purpose of illustrating that my invention is adapted for and will successfully operate under any and all conditions to which it may be subjected.

The bridges to which my invention is applicable have the usual rollers P, (see Figs. 2 and 3,) with which the ledge J engages to support the ends of the bridge when closed, which friction-rollers may be journaled in the usual standards P', and the approach to the bridge has the usual guard-railing Q for either vehicles or passengers, or both.

Having described my invention, what I claim, and desire to secure by Letters Patent, is—

1. The combination, with a turn or swinging bridge and the abutment or approach thereof, of a gate composed of a series of pivoted and individually-weighted standards flexibly connected together, substantially as described.

2. The combination, with a turn or swinging bridge, of a gate composed of a series of pivoted and weighted standards flexibly connected together, and a series of pivoted latches adapted to be actuated by the bridge to lock the gate in a closed position and unlock the same when the bridge is opened, substantially as described.

3. The combination, with a turn or swinging bridge, a gate composed of pivoted standards flexibly connected together, of a number of pivoted latches, a crank-shaft connected with said latches, and crank-arms projecting from such shaft and adapted to be engaged by the bridge, substantially as and for the purpose described.

4. The combination, with a turn or swinging bridge, a gate composed of pivoted standards flexibly connected together and provided with recesses, of a number of pivoted latches adapted to engage said recesses and lock the standards in an upright position, and a crank-shaft having crank-arms adapted to be engaged by the bridge and actuate the latches to disengage them from the gate, substantially as described.

5. The combination, with a turn or swinging bridge, a gate composed of pivoted standards flexibly connected together and having at their lower ends below their pivots weights provided with recesses, of a number of pivoted latches adapted to engage said recesses and lock the standards in an upright position, and a crank-shaft having crank-arms adapted to be engaged by the bridge and actuate the latches to disengage them from the gate, substantially as described.

NICOLAS BOSMANN.

Witnesses:
R. C. OMOHUNDRO,
MANTON MAVERICK.